United States Patent
Kimura

[11] Patent Number: 6,010,671
[45] Date of Patent: Jan. 4, 2000

[54] PROCESS FOR SELECTIVE RECOVERY OF URANIUM FROM SLUDGE

[75] Inventor: Richard T. Kimura, Richland, Wash.

[73] Assignee: Siemens Power Corporation, Richland, Wash.

[21] Appl. No.: 09/084,025

[22] Filed: May 22, 1998

[51] Int. Cl.⁷ .............................. C01G 56/00; C22B 60/00
[52] U.S. Cl. ........................................................ 423/3
[58] Field of Search ............................ 423/3; 210/679; 588/20; 502/404

[56] References Cited

U.S. PATENT DOCUMENTS

| | | | |
|---|---|---|---|
| 3,520,805 | 7/1970 | Ryan | 210/32 |
| 4,025,428 | 5/1977 | Wegmuller et al. | 210/36 |
| 4,705,672 | 11/1987 | Mccurdy et al. | 423/3 |
| 4,800,024 | 1/1989 | Elfline | 210/665 |
| 4,902,665 | 2/1990 | Elfline | 502/402 |
| 5,098,677 | 3/1992 | Sauer et al. | 423/11 |
| 5,614,458 | 3/1997 | Webb et al. | 502/401 |

FOREIGN PATENT DOCUMENTS

| | | | |
|---|---|---|---|
| 2550097 | 2/1985 | France | 210/679 |
| 61-270700 | 11/1986 | Japan | 588/20 |
| 63-11899 | 1/1988 | Japan | 588/20 |
| 3-71098 | 3/1991 | Japan | 588/20 |

*Primary Examiner*—Steven Bos
*Attorney, Agent, or Firm*—Ira Lee Zebrak

[57] ABSTRACT

A process for recovering uranium from a waste sludge involves treating the sludge with a non-reactive, non-absorptive cellulose filtration media, adding an oxidant and heating the mixture to dissolve any uranium present. The mixture is passed through a filtration device precoated with the same filtration media, where the solids are captured while the dissolved uranium passes through as part of the filtrate, for recovery.

13 Claims, 2 Drawing Sheets

PROCESS FOR SELECTIVE RECOVERY OF URANIUM FROM SLUDGE

TECHNICAL FIELD

This invention relates to the recovery of uranium from waste sludge.

BACKGROUND

During the production of componets such as fuel pellets used in fuel rods for nuclear reactors, there is an inevitable loss of some uranium to various effluent streams. These streams are typically collected with the uranium and various other solids settled by gravity to form a sludge.

Even though a relatively small amount of uranium is contained in this effluent, its value, and concerns over disposal, makes it desirable to recover this uranium to the extent possible.

While various attempts have been made to recover this uranium, these have had limited success. For example, the sludge typically contains other salts which complicate recovery schemes. The sludge will normally include ammonium, sodium, fluoride, and various nitrate and sulfate salts. In addition, the nature of the sludge is such that it is difficult to handle and treat, as the sludge has a slime-like consistency which typically coats out recovery devices. While filter aids such as diatomaceous earth, can be used, these typically absorb uranium and thus themselves result in a further loss of the material.

SUMMARY OF THE INVENTION

It is an object of the present invention to provide a process for selective recovery of the uranium from sludge.

It is a further object to provide a process for selective recovery of uranium from sludge which contains high concentrations of compounds such as ammonium, sodium, fluoride, nitrate and sulfate salts.

It is yet another object of the present invention to achieve an economic yet reliable process for the selective recovery of uranium from the waste.

These and other objects of the present invention are achieved by a process comprising:

providing sludge containing uranium in the form of a slurry;

adding a uranium dissolving compound to the slurry;

heating the slurry;

providing a non-reactive cellulose filtration media;

providing a filtration device;

treating the filtration device with the non-reactive cellulose filtration media;

passing the slurry through the filtration device and collecting a filtrate containing dissolved uranium.

In a preferred embodiment, a portion of the non-reactive cellulose filtration media is added to the slurry to increase its body and filterability. Using the inventive process, recovery of uranium from sludge is maximized. The non-reactive cellulose filtration media, though considered difficult to use, has been surprisingly found to be successful in allowing dissolved uranium to pass through without hold-up. Such a process is thus effective in separating the solids components of the slurry from the dissolved uranium, without absorbing the uranium passing therethrough, and has resulted in a 200% increase in the recovery of uranium over conventional processing.

DETAILED DESCRIPTION OF THE INVENTION

Figure 1:
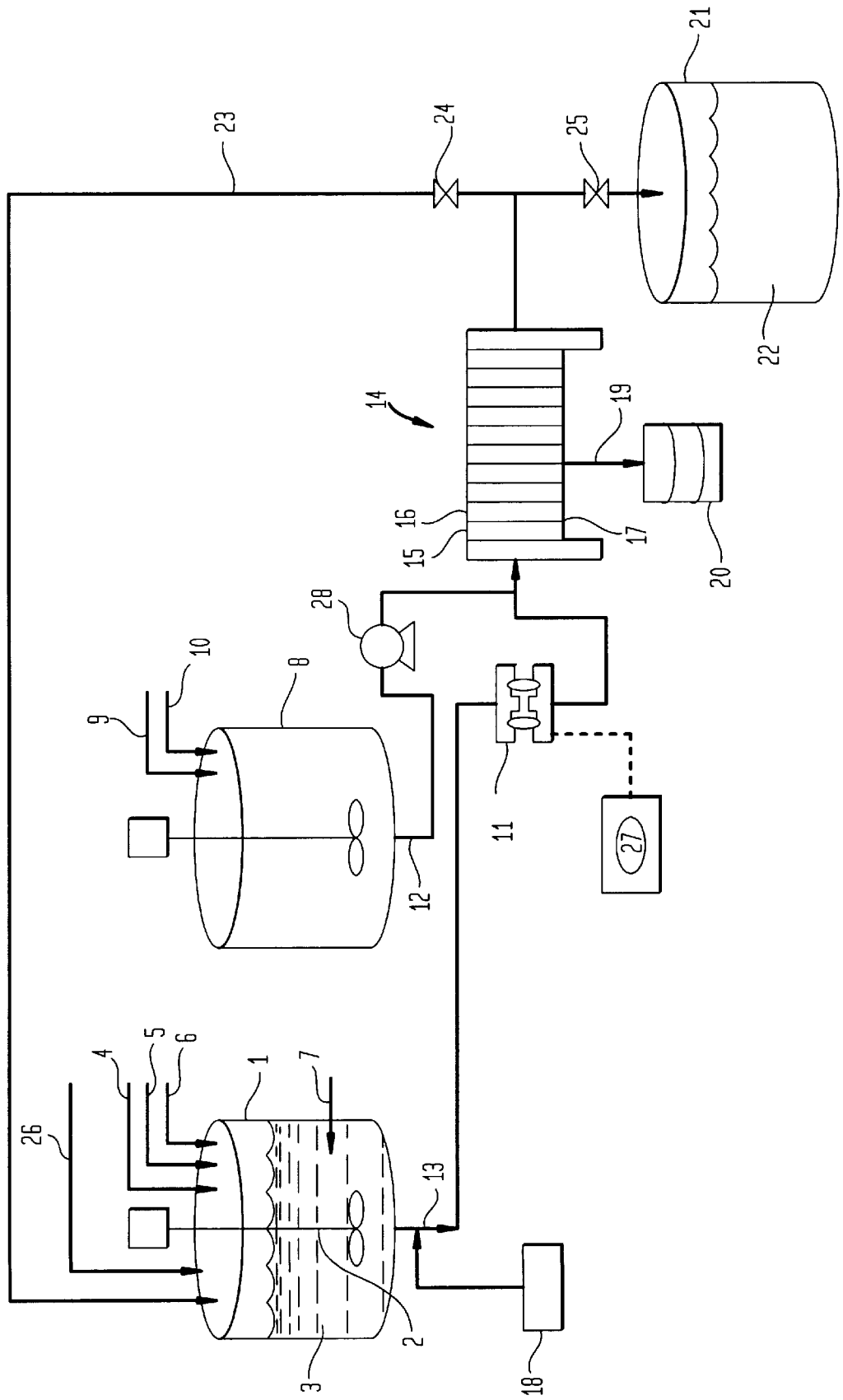
FIG. 1 is a schematic view illustrating the process of the present invention.

Referring to FIG. 1, a schematic view illustrating the process of the present invention is shown. A feed tank 1 includes an agitator 2 for mixing a slurry 3. The slurry comprises a sludge including uranium, as well as liquid and solid waste containing various ingredients including but not limited to sand, ammonium fluoride, ammonium nitrate, ammonium sulfate, sodium nitrate, sodium fluoride, nitrate and sulfate salts, other debris, polymer slimes, phosphates, and metal compounds containing, for example, zirconium, aluminum, and gadolinium. Dissolved uranium may also be contained in the liquid portion of the slurry. Typically, this slurry is prepared by collecting sludge at the bottom of a lagoon which is then either fed directly through a line 4 to the feed tank I or the sludge may be collected off site, optionally dewatered, and transported to the location where the apparatus of the present invention is arranged for processing.

In addition to the slurry 3, water 5 may be added to provide a better dispersion of the solids to aid in filtering. Optionally, a non-reactive cellulose filtration media 6 is added to the feed tank so as to improve the body of the material which is fed to the filter preferably provided as a raw cellulose slurry made up at about 0.5–1.5 lb./gal. For example, it is preferable to have a cellulose concentration of about 0.06 lbs. to 0.125 cellulose per gallon of slurry added into the slurry feed tank. These ingredients are mixed together in the feed tank.

The feed tank 1 preferably has means to heat the contents thereof This can be accomplished using internal coils, an external tank jacket or an external heat exchanger in a recirculating loop. However, direct steam injection, which is the simplest method, is preferred, and this is illustrated as line 7. The feed tank 1 is heated by the injection of live steam to a temperature of about 110–180° F., preferably about 160° F.

A precoat tank 8 is also provided. A non-reactive cellulose filtration media 9, usually obtained in dry form, is added to the tank 8 and mixed with water 10. A pump 28 is provided to pump precoat into a filter press 14.

A pump 11 is provided to transfer slurry to the filter press, with valves 12 and 13 provided for selecting the flow to be delivered to the press. The filter press 14 is used to separate the solids from the liquid. The filter press is a multiple plate and frame device which include a plurality of alternating plates 15 and frames 16 which are pressed together, each frame including a filter 17 made of a material such as cloth. While various filters can be used, a polypropylene filter cloth having a pore size of about 1 to 5 microns is preferred which provides a filtration rate of about 1 to 3 cubic feet per minute at pressures up to 125 psig. The solids passing through the filter press are collected on the cloth. After a batch of material has been transported through the filter press, wash water 18 is passed through the filter press to remove residual liquid. Then the flows are stopped, and the plates are separated so that solid material collected between the plates can be removed as a low water content cake 19. Since in this instance, the cake comprises dewater sludge, it is typically collected in drums 20 for disposal.

A filtrate tank 21 is provided for capturing the liquid filtrate 22 which has passed through the filter press. However, it is typical to use a recycle line 23 to send the filtrate stream back to the feed tank until a steady state condition is achieved within the filter press and substantially all of the solids are being captured such that a clear filtrate is obtained. Once it has been determined that the filtrate is clear, the valves 24 and 25 are arranged so that the filtrate is valved to the filtrate tank for collection.

In many instances, it is preferable to wash the filter cake before it is subject to disposal and water is typically passed through the filter press so as to remove any holdup of liquid which may contain, for example, the dissolved uranium which is recovered according to the present invention.

The feed tank 1 is also supplied with an oxidant 26 which assures that any uranium within the slurry in solid form is dissolved so that it can pass through the filter to the filtrate tank. While various oxidants can be used, it is preferred to use a sodium hypochlorite solution (12% wt.) added at about 0.5–2% volume per volume of slurry, about 1% being preferred, to assure dissolution of the uranium into the liquid portion of the slurry. The oxidant 26 is added to the feed tank 1 selectively oxidizes uranium to maximize the concentration of uranium in the filtrate. For sodium hypochlorite, the reaction is as follows:

$$U^{4+} + NaOCl + H_2O => UO_2^{2+} + NaCl + 2H^*$$

Thus, the heating and oxidant assure that the uranium present in the slurry is dissolved into the liquid portion of the slurry.

This material is agitated by the mixer 2 so as to prevent settling.

As described previously, the non-reactive filtration media 9 is usually obtained in solid form and generally delivered in bulk. The media when mixed with water, forms a slurry, containing about 0.5 to about 1.5 pounds filtration media per gallon of water. The media is non-reactive (with uranium) and non-absorptive (of uranium) so that substantially all the uranium in the slurry is separated and collected in the filtrate. It is also of a type and particle size to facilitate filtration of "slimy" slurries, that is, those which would "blind" the filter cloth in the absence of the filtration medium. Generally, cotton or wood fiber cellulose with a particular particle size distribution is effective for this application. These are shown in Tables 1 and 2. While other filtration media are known, for example, diatomaceous earth, aluminum silica, ashed rice hulls, and wood fiber and cotton fiber cellulose materials with other particle size distributions, surprisingly only the particular cellulose filter media described were successful in being ilon-reactive with uranium and providing a dry cake with no free standing liquids and clear filtrate.

TABLE 1

| SIZE (MICRON, um) | WEIGHT % |
|---|---|
| ACCEPTABLE DISTRIBUTION #1 | |
| <45 | 16.0 |
| 45–100 | 24.3 |
| 106–150 | 12.7 |
| 150–180 | 8.8 |
| 180 | 28.9 |
| >250 | 9.3 |
| TOTAL | 100% |

TABLE 1-continued

| SIZE (MICRON, um) | WEIGHT % |
|---|---|
| ACCEPTABLE DISTRIBUTION #2 | |
| <74 | 70 |
| 74–147 | 22 |
| 147–351 | 8 |
| TOTAL | 100% |

Once the precoat slurry is prepared, it can be fed to the filter press, so as to precoat the surfaces of the filter cloth. As an example, to effectively precoat a filter press which has 1600 sq. feet of filter surface area, about 200 gallons of the raw cellulose slurry, having about 1.25 lbs. per gallon of cellulose is further diluted with about 400 gal. of water to have a cellulose concentration of about 0.41 lbs. per gal. This is fed to the filter press where the cellulose is deposited as a first layer of captured solids, known as the precoat. After the filter cloth has received the precoat from pump 28, the pump 11 is started and slurry feed from tank 1 is fed to the filter. The pressure is controlled to prevent blinding of the filter cloth, by starting at a low pressure and slowly ramping up the pressure as the cake is formed on the cloth. The pressure is ramped up so as to overcome the increasing resistance encountered as the solid material thickens on the cloth of the filter plates. Preferably, a programmable logic controller 27 begins with an initial pressure of about 25 psig, with increasing pressure increments of about 5 psig applied at 3 minute intervals. This program has been found to insure that sufficient time is allowed to build up solids at the pumped pressure while minimizing the overall cycle time to complete formation of the filter cake.

The clear filtrate 22 is collected in the filtrate tank 21, and is preferably sampled and analyzed to verify the uranium concentration. Since the uranium has been selectively removed from the slurry, the filtrate is readily adaptable for separation of the uranium content using known procedures. For example, the uranium can be recovered using conventional processes such as by using an ion exchange resin, by precipitation, or by solvent extraction. Of course, other processes may be used.

Figure 2:
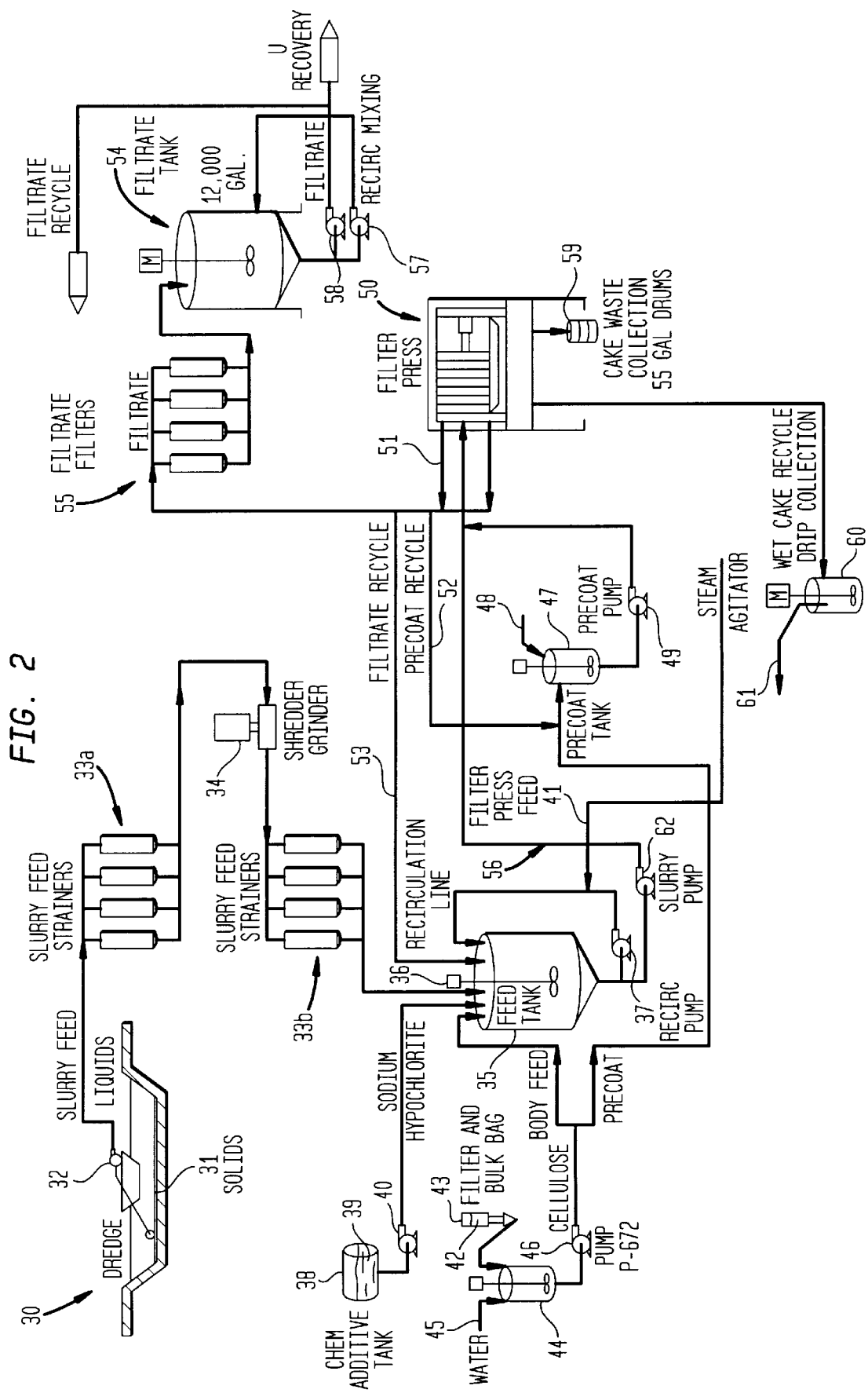
FIG. 2 is a detailed schematic view showing an on-site application of the process according to the present invention.

Referring to FIG. 2, an overall process flow diagram is shown for the on site recovery of uranium using the process of the applicant's invention.

Typically, waste water from a facility using uranium will accumulate within a vessel such as a lagoon 30. In this lagoon, a layer of solids 31 settles to the bottom. These solids are removed using a slurry pump 32, and are fed through strainers 33a and 33b and a grinder 34 to separate and/or break up any agglomerated material prior to entrance to a feed tank 35. The grinder pulverizes the large solids to produce a maximum particle size of less than about ⅛ inch, as larger particles could disrupt the filtration process.

The feed tank 35 contains an agitator 36, and has a dedicated pump 37 for recirculating the material in the tank. It also has a slurry feed pump 62 to feed the filter press. An additive tank 38 contains an oxidizing agent 39 which is transferred by a pump 40 to the feed tank for dissolving any solid uranium contained in the slurry. Preferably, 12% by weight sodium hypochlorite solution is used as the oxidizing agent. This is added at 1% by volume to the volume of the slurry. For example, to treat 6,000 gals. of slurry would require 60 gals. of sodium hypochlorite solution. A steam injector 41 is located in the tank recirculating line to heat the slurry as it recirculates to facilitate uranium dissolution.

A non-reactive cellulose filtration media 42 is received in a bulk bag 43 which contains about 400 to 1,000 lbs. of the dry filtration media, which is added to a mixing tank 44 along with water 45 to provide a raw cellulose slurry with a solids content of about 0.5 to 1.5 lbs. per gal. of water about 1.25 lbs./gal. preferred. About 800 gals. of water would be added per 400 to 1,200 lbs. of the non-reactive cellulose filtration media.

The raw cellulose slurry about 1.25 lbs. per gal., is transferred by a pump 46 to the feed tank 35 in an amount sufficient to provide at least 0.06 lbs. cellulose per gal. waste slurry. The cellulose in the feed tank is uniformly distributed in the waste slurry by the agitator 36. The purpose is to increase the body of the slurry to facilitate filtration.

The pump 46 also supplies the raw cellulose slurry at about 1.25 lb./gal. to a precoat tank 47 where water 48 is added to provide a precoat slurry at about 0.16 to 0.4 lbs./gal. water.

The precoat is fed from the tank 47 by a pump 49 to a filter press 50 of the plate and frame type discussed previously. However, other filtration devices may also be used. Water filtrate 51 leaves the filter press and this can be returned to the precoat tank, through line 52, returned to the feed tank, through line 53, or sent to a filtrate tank 54. The slurry pump 63 pumps slurry to the filter press. As the slurry from the feed tank passes through the filter press, the discharge is monitored. If cloudy, the discharge is send back to the feed tank; if clear, it is fed to the filtrate tank, with a series of filters 55 preferably used to remove any residual solids from the filtrate. After the pressure reaches its maximum, and the flow through the filter drops off, water 56 is fed to the filter to wash the filter cake before the press is opened for cake removal. A pump 57 is provided for dedicated recirculation and mixing of the filtrate. A second pump 58 is used to transfer the filtrate to a uranium recovery process (not shown).

The cellulose filtration media may vary from the distributions described above, with adjustments made to the process through the programmable logic controller, by modification to the amounts and concentrations added as precoat and as a body feed, etc., as would be understood by one familiar with filtration processes. The cellulose filtration media may have a particle distribution of from about 0–6% having a particle size of 351 microns or greater, about 60–96% having a particle size of about 147 microns and about 23–83% having a particle size of about 74 microns or less. Preferably, the cellulose filtration media has a particle size distribution in which about 24% by weight has a particle size of about 45–100 microns and about 28% has a particle size of about 180 microns. Alternatively, at least 70% by weight has a particle size less than 74 microns and 22% a particle size of 74–147 microns.

While the term "particle size" is used, it should be understood that the cellulose filtration media is fibrous, and that these particle sizes correlate to a typical screen analysis, 351 microns being the equivalent of a 40 mesh screen, 147 to a 100 mesh screen and 74 to a 200 mesh screen.

The fibers themselves have a length of about 30–200 microns and a width of about 10–40 microns.

Solids from the filter press are collected in a waste drum 59 for disposal. Any liquid residue that accumulates during solids removal and/or cleaning of the press between filtration cycles is collected in a tank 60 and returned to the feed tank through line 61.

Utilizing the process of the present invention, a significant increase in the recovery of uranium from solid waste is achieved. Prior to utilizing the process of the invention, recoveries in the filtrate were on the order of about 147 milligrams per liter. Utilizing the process of the invention, the amount recovered is on the order of 428 milligrams per liter, a nearly 200% increase in uranium recovery. Further, the increased recovery evidences a significant decrease in the amount of uranium remaining in the solid material, thus reducing the amount lost through disposal.

While preferred embodiments of the present invention have been shown and described, it will be understood by those skilled in the art that various modifications or changes can be made without varying from the scope of the present invention.

I claim:

1. A process for the separation and recovery of uranium from a sludge comprising:

providing a sludge containing uranium in the form of a slurry;

adding a uranium dissolving compound to the slurry to dissolve the uranium;

heating the slurry containing dissolved uranium;

providing a cellulose filtration media which is non-reactive with uranium and non-absorptive of uranium in the form of a raw cellulose slurry;

providing a filtration device;

feeding the raw cellulose slurry to the filbration device in an amount sufficient to form a coating layer therein;

passing the dissolved uranium containing slurry through the cellulose coated filtration device such that solids in the uranium containing slurry are captured in the filtration device and dissolved uranium passes therethrough in a liquid filtrate.

2. The method of claim 1, further comprising adding a portion of the raw cellulose slurry to the uranium containing slurry, and distributing the raw cellulose slurry therein.

3. The method of claim 1, wherein the raw cellulose slurry has a cellulose concentration of about 0.5–1.5 lbs./gal. water.

4. The method of claim 1, wherein the uranium dissolving compound is an oxidant.

5. The method of claim 1 wherein the uranium dissolving compound is sodium hypochlorite.

6. The method of claim 1 further comprising diluting a portion of the raw cellulose slurry by adding water, to provide a precoat slurry, the precoat slurry having a cellulose concentration of about 0.16 to about 0.4 lbs. per gal., and then feeding the precoat slurry through the filtration device.

7. The method of claim 1 wherein the non-reactive non-absorptive cellulose filtration media has a particle size distribution in which about 24% by weight has a particle size of about 45–100 microns and about 28% has a particle size of about 180 microns.

8. The method of claim 1 wherein the non-reactive non-absorptive cellulose filtration media has a particle size distribution in which at least 70% by weight has a particle size less than 74 microns and 22% has a particle size of about 74–147 microns.

9. The method of claim 1 wherein the non-reactive non-absorptive cellulose filtration media has a particle distribution of from about 0–6% having a particle size of 351 microns or greater, about 60–96% having a particle size of about 147 microns and about 23–83% having a particle size of about 74 microns or less.

10. The method of claim 1 wherein the filtration device is a plate and frame filter press.

11. The method of claim 1, further comprising stopping the passage of the dissolved uranium containing slurry through the filtration device, and passing water through the filtration device to wash the solids from the filtration device.

12. The method of claim 2, wherein about 0.06 to 0.125 lbs. of cellulose are provided per pound of the dissolved uranium containing slurry.

13. The method of claim 1 wherein the dissolved uranium containing slurry is heated to a temperature of about 110–180° F.

* * * * *